(12) United States Patent
Lutzker

(10) Patent No.: US 7,100,495 B2
(45) Date of Patent: Sep. 5, 2006

(54) APPARATUS AND METHOD FOR IMPROVING THE TASTE OF WINES

(76) Inventor: Robert S. Lutzker, 10 Woodstone Ct., So. Huntington, NY (US) 11746

( * ) Notice: Subject to any disclaimer, the term of this patent is extended or adjusted under 35 U.S.C. 154(b) by 138 days.

(21) Appl. No.: 09/835,861

(22) Filed: Apr. 16, 2001

(65) Prior Publication Data

US 2004/0208954 A1   Oct. 21, 2004

Related U.S. Application Data

(63) Continuation-in-part of application No. 29/137,419, filed on Feb. 21, 2002.

(51) Int. Cl.
*C12H 1/00* (2006.01)
*B01D 35/06* (2006.01)

(52) U.S. Cl. .................. 99/277.1; 99/275; 210/222

(58) Field of Classification Search ........... 99/277.1, 99/277.2, 277, 276, 275; 210/222; 220/230
See application file for complete search history.

(56) References Cited

U.S. PATENT DOCUMENTS 5,113,751 A * 5/1992 Holcomb et al. ............. 99/286
6,287,614 B1 * 9/2001 Peiffer ........................ 426/237

* cited by examiner

*Primary Examiner*—Reginald L. Alexander
(74) *Attorney, Agent, or Firm*—Thomas A. O Rourke; Bodner & O'Rourke, LLP

(57) ABSTRACT

The present invention is directed to a method and apparatus of treating wine to improve the wine's taste. This is accomplished by treating the wine with a magnetic field formed by one or more magnets, preferably at least two magnets. These magnets are positioned with one magnet at the base of a container that is holding the wine and another magnet at the top of the container.

28 Claims, 4 Drawing Sheets

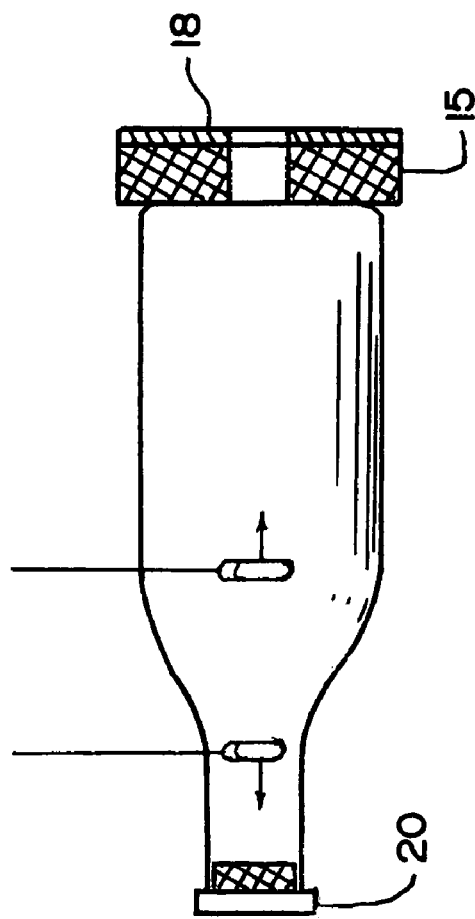
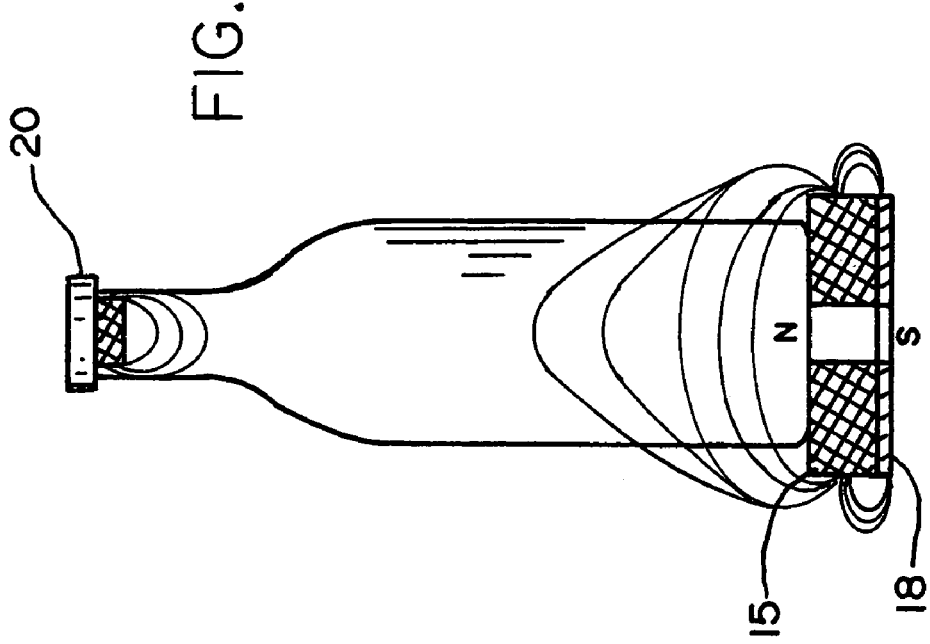

APPARATUS AND METHOD FOR IMPROVING THE TASTE OF WINES

This application is a continuation in part of application Ser. No. 29/137,419 filed on Feb. 21, 2002, the disclosures of which are incorporated herein by reference.

FIELD OF THE INVENTION

The present invention relates to the field of beverages such as alcoholic beverages including beer and wines and other beverages such as coffee. In particular, the invention relates to improvements in the taste and enjoyment of certain beverages containing polar molecules including water, coffee and alcohol including wines. More particularly the present invention relates to apparatus and methods for eliminating some of the aggressiveness that some people perceive in the taste of some wines as well as creating a rounder smoother tasting wine.

BACKGROUND OF THE INVENTION

Wine making is a complex blend of art, science and luck. Wine making is a very old process. For about 5,000 years man has used grapes to make wines by fermentation. Wine as used herein is defined as a liquid made by the partial or complete fermentation of the juice of grapes, and other fruits or berries. Grapes are the only fruit with a sufficiently high natural level of sugar and have the proper balance of acid and nutrients to sustain natural fermentation to dryness with stable results. Other fruits and berries may be fermented but usually require the addition of sugar, acid or various yeast nutrients to avoid spoiling.

Although there have been improvements in various aspects of the wine making process over the years, these improvements have been primarily in the equipment used in the processing of the grapes. The basic reaction by which grapes are transformed into wine remains unchanged. Typically, grapes are crushed to release the juice into a fermentation vessel. When the fermentation is complete the wine is pressed to separate the liquid from the stems, skin, pips and pulp. Wine is then stored to age and clarify.

Ripe grapes naturally have yeast cells residing on their surface that aid and abet the reaction of grapes into wine. When the yeast comes into contact with grape juice, the yeast begins to feed on the juice. The yeast contains an enzyme, zymase, that converts sugar in the grape juice to alcohol and carbon dioxide, as well as releasing heat. The reaction continues naturally until the sugar has been converted or the yeast dies off or weakens. The formula for the creation of wine is as follows

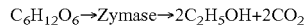
$$C_6H_{12}O_6 \rightarrow Zymase \rightarrow 2C_2H_5OH + 2CO_2$$

Fermentation will usually take about three weeks. During the first few days of the process frequently called aerobic fermentation, the reaction usually produces more yeast through reproduction of the yeast cells. This first step is followed by anaerobic fermentation which produces the most alcohol. Fermentation may be permitted to continue until there is no residual sugar or the reaction may be terminated at some point during the process to vary the level of sweetness. The reaction is usually terminated by killing or removing the yeast cells. This may be accomplished by adding alcohol to raise the level to 15% or more, adding sulfur dioxide or sorbate (sorbic acid), by filtering through a sterile filter or by chilling the must and filtering out the yeast cells.

The color of the wine comes from contact by the grape juice which is clear, with the skin of the grapes. The more color the skin has plus the amount of time the juice is in contact with the skin increases the color of the wine. Different steps in the making of the wine can cause variations in the taste and bouquet of the wine, for example, juice separated from the must before pressing usually has less bitterness and oxidation. This is called "free run." The leftover skins, pips and pulp is called the marc and usually has a lower fixed acidity but a higher volatile acidity as well as higher tannin than the free run. The speed and pressure of the press may also affect the wine. Too much pressure in the press may cause bitter tannins to leach from the seeds.

There is also a second fermentation that occurs in most wine making. This is called malolactic fermentation. In this type of fermentation, bacteria i.e., lactobacillus, converts some of the malic acid naturally present in grapes into lactic acid along with the resultant by product of carbon dioxide. Malolactic fermentation usually has the effect of softening the wine i.e., taking some of the edge off the wine.

Acids are a natural component of wine. However, if a wine is too low in acid the wine tastes too flat and dull. If the wine has too great an amount of acid the wine tastes too tart and sour. as a result, the wine maker frequently manipulates the acidity in the wine. The principal acids formed in grapes and therefore in wine are, tartaric acid, potassium hydrogen tartrate, malic acid and potassium hydrogen malate. The relative amounts of acid depend on the grape variety used to make the wine. In addition, the growing temperature of the grapes can also affect the amount of acidity in a wine. For example, the grapes grown in the Chablis region of France have a high acid content because the growing climate is relatively cool. On the other hand, the grapes grown in California's Napa Valley have a lower acidity because of the higher temperatures that these grapes grow at. Conversely, the higher the growing temperature, the higher the sugar content in the grape juice. Thus, the Napa Valley grapes have low acidity and higher sugar content than the Chablis grapes which are grown at a lower temperature.

Because of all the variations in the types of grapes, the region where the grapes are grown, the wine making process, the weather during a particular growing season and other factors there can be enormous variations in the taste of wines even made from the same type of grape. Some additional factors besides the foregoing that have a significant bearing on the quality of the final product include whether the barrels for the cellaring are made from French Oak, American Oak or some other material. Transport conditions and temperatures maintained during the distribution process are also important. For example, the length of time in transit in hot trucks can vary the quality of the wine compared to shipment in cooler conditions and for shorter periods of time. The length of time in a warehouse or on a retail shelf or exposure to U.V. light can introduce variations in the taste of a wine that are not always beneficial to the wine. In addition, because individual taste buds vary, the same wine may taste different to two different people. Thus a wine that tastes smooth to one person may taste sharper to another. In addition, some wine may be more bitter tasting than others.

OBJECTS OF THE INVENTION

It is an object of the invention to provide a method of improving the taste and/or bouquet of a wine.

It is another object of the present invention to provide an apparatus to improve the taste and/or bouquet of wine.

It is an object of the invention to provide a method of improving the enjoyment of a wine.

It is also an object of the invention to provide an apparatus for improving the enjoyment of a wine It is still a further object of the present invention to provide a wine that is demonstratively smoother and less sharp than a wine that has not be treated by the method of the present invention.

It is also an object of the present invention to provide an apparatus for treating wine to render it smoother and less sharp than a wine that has not be treated by the apparatus of the present invention.

SUMMARY OF THE INVENTION

The present invention is directed to a method and apparatus of treating wine to improve the wine's taste, bouquet or nose. This is accomplished by treating the wine with a magnetic field formed by one or more magnets, preferably at least two magnets. These magnets are positioned with one magnet at the base of the container that is holding the wine and another magnet at the top of the container. In a preferred embodiment, the magnet at the top of the container is located in a stopper that may be inserted into the orifice of the container. One or more plates that are preferably attracted to the magnet at the base are preferably present on the underside of the magnet. The presence of the plate is believed to create a stronger more directional magnetic force field. The plate further functions as a shunt that reduces or eliminates the magnetic field in the direction below the base.

The amount of time that the wine is treated by the magnetic field can vary. It has been found that even treatment for relatively short periods of time can significantly improve the taste of the wine.

BRIEF DESCRIPTION OF THE DRAWINGS

FIG. 10 is a representation of what is believed to be the approximate flux path of the magnetic field to be when the stopper is placed in a bottle and the bottle was placed on the base of the present invention with a metal plate on the underside of the magnet.

FIG. 11 shows an example of the distance of attraction and the direction of force to the base and top magnet

DETAILED DESCRIPTION OF THE INVENTION

Figure 3:
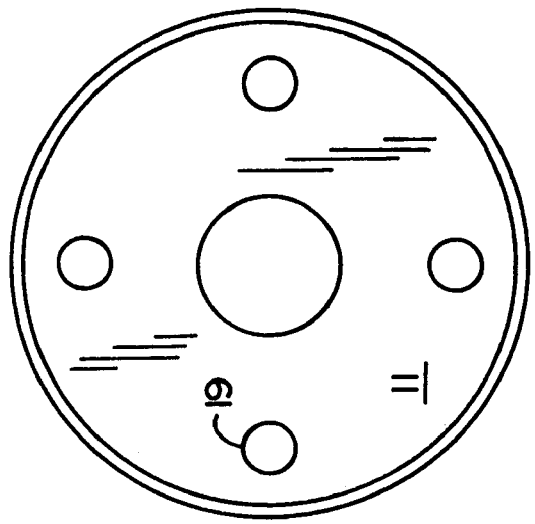
FIG. 3 is a bottom view of the stand of FIG. 1.
Figure 2:
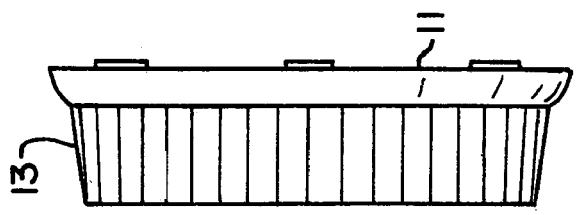
FIG. 2 is a side view of the stand of FIG. 1.
Figure 1:
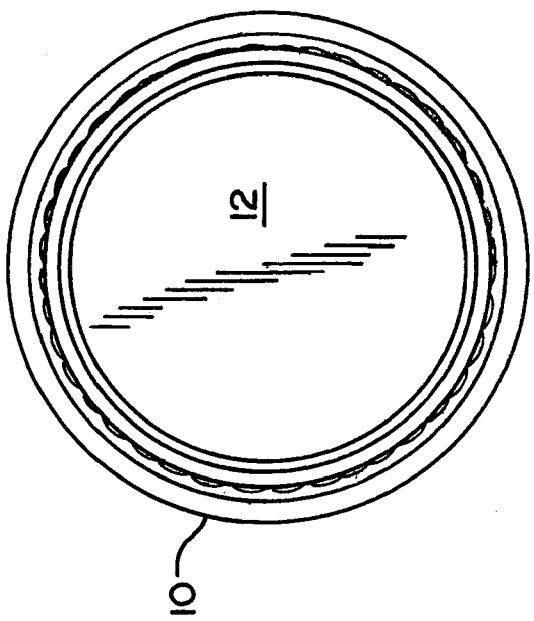
FIG. 1 is a top view of the stand containing a magnet for locating the base of the container of wine.

As shown in FIG. 1, there is a base 10 having a bottom surface 11, a top surface 12 and one or more side surfaces 13. In a preferred embodiment, the top surface is recessed at least slightly such that the side surface 13 extends above the plane of the top surface 12 to form a side wall 14, thus providing a more stable base and reducing the risk of spillage. The top surface of the base is separated from the bottom surface by a distance sufficient to permit a magnet 15 to be placed into the base. In an alternative embodiment the top surface of the base may be a surface of the magnet.

The base may have virtually any shape. In addition, the internal area formed by the side wall may also be any shape. It is preferred that the area formed by the side wall be the same as the shape of the container to be mounted on the base. For example, where the container of wine is a round bottle, the side wall is preferably, but not required to be, round to accommodate the shape of the bottle. In the event the container of wine is square or some other shape the side wall can be made to fit that shape also. The base can hold a bottle, a carafe, a glass of wine, a mug or any other type of container.

The base may be made out of any suitable material. It is preferred that the base be made of a material that does not inhibit a magnetic field extending from the top surface 12 of the base 10. Suitable materials for the construction of the base are plastics such as but not limited to polyproplyene, nylon, ABS or many other plastics. Other materials that may be used for the construction of the base are wood, glass, ceramic, or metals provided that the top surface 12 does not affect the magnetic field generated by the magnet. In addition, the top surface of the base should not have a density that shunts or weakens the magnetic force field below the level desired.

Figure 4:
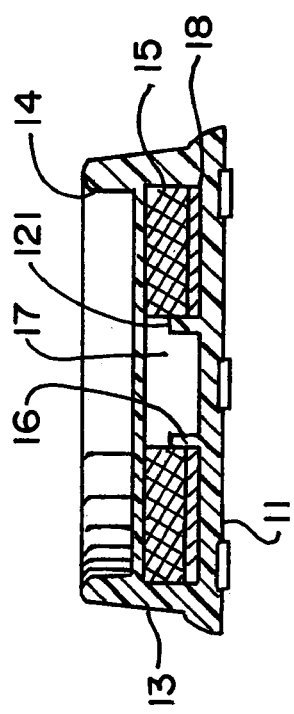
FIG. 4 is a cutaway view of the stand of FIG. 1 showing the arrangement of the magnet in the stand.

As seen in FIG. 4 the magnet 15 is preferably in the shape of a ring with a hollow center 17. The magnet ring is preferably held in place in the base by a guide 16 that prevents the magnet from moving around in the base, or the magnet is the size of the cavity in the base housing. It will be appreciated that the magnet may be any shape in the base. In addition, the magnet need not have an open center portion 17. It has been found, however, that a ring magnet as shown in FIG. 4 provides the most improvement in the taste of the wine. It is believed that this is due to the shape of the magnetic field generated by these types of magnets.

One or more plates 18 that are preferably attracted to the magnet at the base are preferably present on the underside of the magnet. The presence of the plate is believed to create a stronger more directional magnetic force field extending upwardly from the base toward the container of wine that is placed on the base. The plate further functions as a shunt that reduces or eliminates the magnetic field in the direction below the base. This is advantageous not only for improving the wine but also is beneficial because it reduces the risk that the underside of the base will be attracted to other metallic objects in the kitchen or other location where the base will be stored or used. In addition, the plate reduces the attraction of the base to other bases during shipping or warehousing the product. The plate is preferably a flat disk however, alternative configurations are possible including a cup like shape with a flat base and sides extending upwardly along the edge of the disk. In addition, the plate preferably has an opening in the center similar to the center opening in the magnet. The presence of the plate permit a weaker magnet to be used to achieve the same result as a thicker magnet without the plate. Another benefit is a reduction in the weight.

The bottom surface 11 of the base is preferably a separate member from the remainder of the base. This facilitates insertion of the magnet or the magnet and plate(s) during assembly. The base can be snap fit, sonic welded, glued or screwed into the underside of the base 10 in order to complete assembly. The bottom surface 11 is preferably provided with a plurality of bumpers 19, usually made of rubber or other similar material. The bumpers help provide the base with a non slip, stable surface to rest on. One of the problems that can be encountered on a humid day is that condensation or other moisture can be present on the surface on which the base is resting. In the absence of non slip bumpers, there is a risk that the base could slide over the surface.

Figure 5:
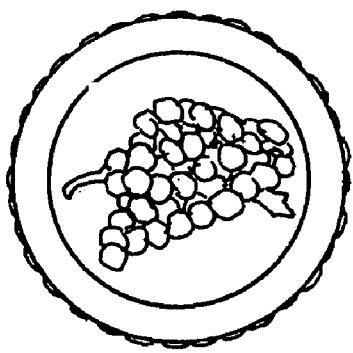
FIG. 5 is a top view of the stopper of the present invention.
Figure 7:
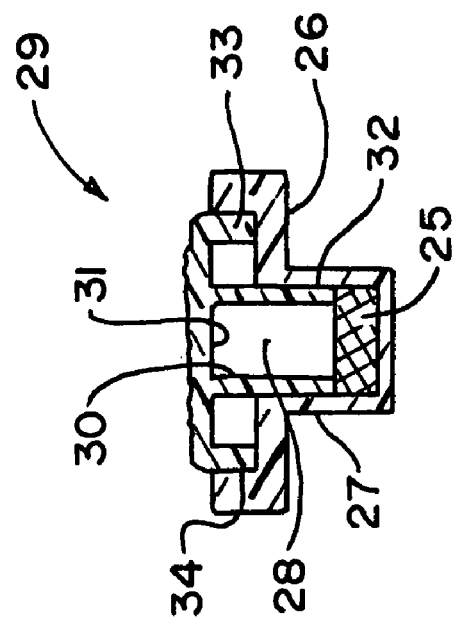
FIG. 7 is a cutaway view of the stopper of FIG. 5 showing the arrangement of the magnet in the stopper.
Figure 6:
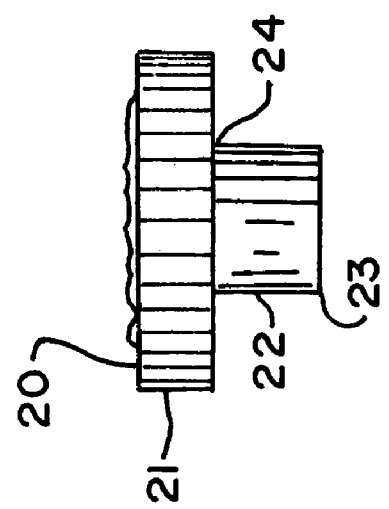
FIG. 6 is a side view of the stopper of FIG. 5.

In order to have optimum treatment of the wine by the magnetic field it is desirable that a second magnet be placed at the end of the container opposite the base. Because the top of most wine containers is very small, it is preferred that the magnet be placed in a stopper as shown in FIG. 7. The stopper 20 of FIG. 5 has a top member 21 and a plug member 22 extending therefrom. The plug member is shaped to be inserted into the orifice of the container. It is preferred that the plug be narrower in cross-section at the tip 23 than at the neck 24 for ease of insertion into the orifice in the container. The fit of the stopper in the container can be loose or a friction fit. Preferably, the top member 21 is larger in cross-section than the cross section of the container top where the stopper is inserted to permit the user to get a grip on the stopper to remove it from the container and to prevent it from falling into the container or bottle. The magnet in the stopper may be in the form of a disk or a ring.

FIG. 7 shows a cut away view of the stopper showing the preferred placement of the magnet in the stopper. The stopper 20 preferably has a body portion or sheath 26. The body portion has a exterior 27 and an interior 28 and is preferably open at its upper surface. The magnet 25 is preferably a disk that rests in the lower interior surface of the stopper. Plug 29 is inserted into the opening in the top of the stopper to hold the magnet in place. The plug 29 has at least one first member 30 that extends from the underside surface 31 of the plug to the magnet 25 to retain the magnet in position and prevent the magnet from moving about in the plug. The first member preferably forms friction fit with the lower interior wall surface 32 of the plug. There is preferably at least one second member 33 that extends from the underside surface 31 of the plug. The second member preferably forms a friction fit with the upper interior wall surface 34 of the plug. The exterior surface of the stopper may be provided with a suitable decoration as desired.

The magnet in the stopper and the base are preferably ceramic grade magnets. However, the magnets may be permanent magnets made of a flexible style, steel, or rare earth, such as neodymium, strontium and alnico, etc. Rare earth magnets are preferably comprised of Samarium cobalt, or neodymium. Preferably the magnets in the base have at least 600 to 1400 surface Gauss on the top of the magnet facing the bottom of the bottle, more preferably at least 800 to 1200 Gauss and most preferably at least 900 to 1100 Gauss. The stronger the magnetic force the shorter the amount of time the wine needs to be treated to achieve the improvements in the taste of the wine. For a magnet having an induction force of at least 700 milliGauss, the amount of time that the wine should be treated is about 15 to about 30 minutes although this amount can vary based of the taste of the user. The coercive force of the magnet (bHc) is preferably in the range of 1500 to 3000 Oersteds, more preferably in the range of 2000 to 2600 Oersteds and most preferably in the range of 2200 to 2400 Oersteds . The $Bh_{max}$ is in the range of 2.5 MGOe to 4.00 MGOe, more preferably in the range of 3.20 to 3.60 MGOe and most preferably in the range of 3.30 to 3.40 MGOe. The maximum temperature that the magnet should be stored or used at is preferably no greater than 400° C.

Other type of magnets that may be used are ferrite magnets which are usually ceramics made primarily from iron and boron with a small amount of strontium. By weight they are stronger than steel or Alnico magnets but not as strong as the rarer earth magnets. One drawback of the ferrite magnets is that they tend to be quite brittle and may break easily.

The magnets in the stopper and the base should have their fields aligned preferably such that the stopper has the south facing down and the base has the north facing up, alternatively, when the stopper has the north facing down, the base can have the south facing up. It has been found that the present invention provides the best overall effect on the wine and other alcohol containing beverages when the stopper and the base both have the south facing down and the north facing up. It is believed that when the south faces downwardly, the south pole of the magnet drives through the north pole forming a circle of magnetic force. However, the beneficial effect of the present invention on wine and other alcoholic beverages may also be achieved where there is no special alignment of the magnets in the stopper or the base. The preferred magnet in the base is a ring magnet with an open center. If the magnet is a disk magnet without the hole or orifice in the center, the turbulence caused by the magnetic field is primarily present at the sides of the magnet and not in the center where a ring magnet is used.

It is believed that the magnetic field that is generated by the magnets causes the certain molecules in the wine to flow from the bottom of the bottle to the top in a constant motion along the flux lines of the magnetic field between the bottom and the top of the magnet. The top magnet is believed to close the loop of the magnetic path between the bottom and top magnet. The ring magnet on the bottom of the bottle is particularly useful where the bottle has a punt at the base of the bottle.

Figure 8:
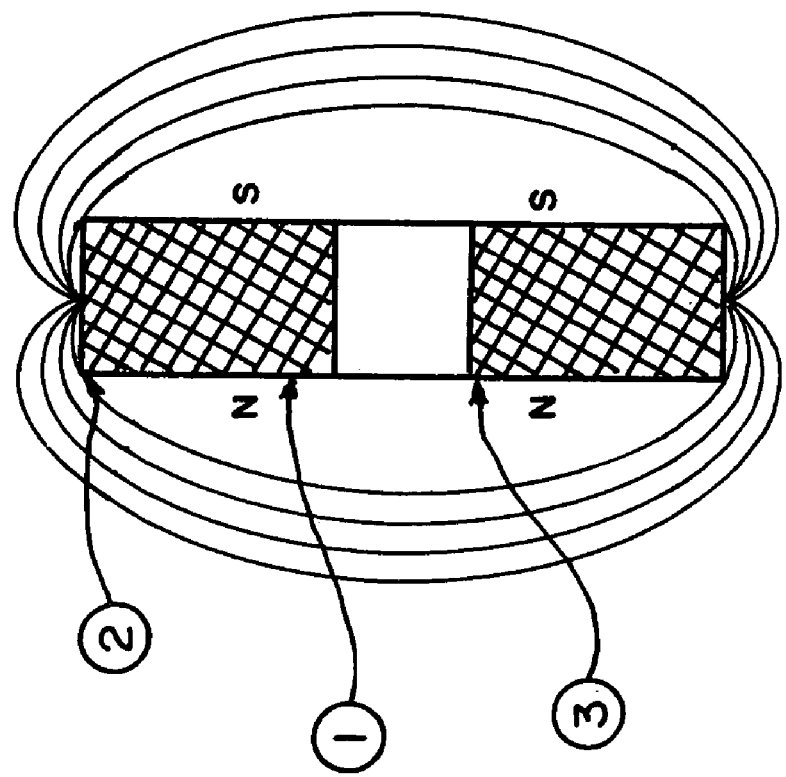
FIG. 8 is a representation of what the magnetic flux lines are believed to be for the base without a stopper present and without the metal plate present.

FIG. 8 is a representation of what the magnetic flux lines are believed to be for the base without a stopper present and without the metal plate present. In this instance, a reading with a Gaussmeter was taken at three points on the North side of the magnet and one on the South side. These reading are as follows

| Location | Gauss Reading |
| --- | --- |
| 1 | 530 |
| 2 | 750 |
| 3 | 950 |
| 4 | 680 |

Figure 9:
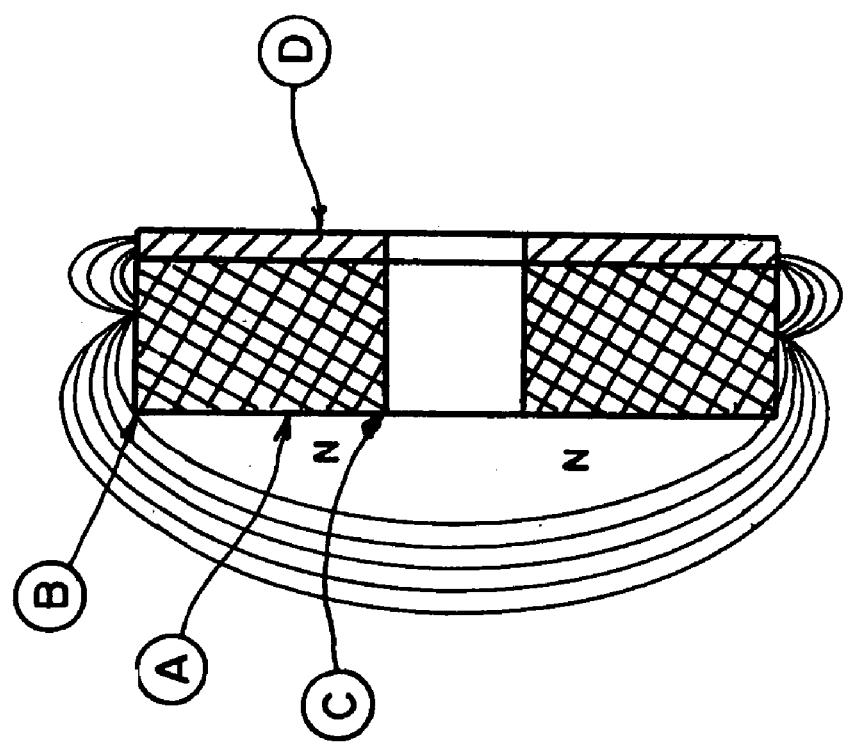
FIG. 9 is a representation of what the magnetic flux lines are believed to be for the base without a stopper present and with the metal plate present.

As seen in FIG. 9, the magnet was provided with a steel plate, in this case a metal washer, placed on the South facing side of the magnet of FIG. 8. The readings were taken at substantially the same locations as shown in FIG. 8 with the Gaussmeter. The reading obtained are as follows:

| Location | Gauss Reading |
| --- | --- |
| A | 730 |
| B | 1200 |
| C | 1170 |
| D | 360 |

As can be seen from the results of the measurements, the presence of the metal washer reduces the magnetic flux at the South side of the magnet and increases the flux at the North side of the magnet. As the thickness of the metal plate increases or if additional plates are added, the amount of leakage of the magnetic flux on the South side of the magnet is further reduced and the magnetic flux at the North side of the magnet increases, does appear to improve the efficiency of the magnet.

FIG. 10 shows what applicant believes the approximate flux path of the magnetic field to be when the stopper is placed in a bottle and the bottle was placed on the base of the present invention with a metal plate on the underside of the magnet. These flux lines are based on the data generated from the example of FIG. 11. FIG. 11 shows an example of the distance of attraction and the direction of force to the base and top magnet. These readings may vary depending on the type of magnet and the points of measurement. This example shows the arrangement of a first magnet at the base of a container and another magnet at the top of a container. The test was performed with top and base magnet laid out in horizontal position in the same form as a bottle would be in if it were in the vertical position using the present invention. The distance between the and the top magnet is 9 inches. A metal paper clip was suspended from a thread in the center line perpendicular to the base magnet. It was noted that for up to 6 inches from the base magnet the paper clip was attracted to the base magnet very easily and from 6.5 inches from the base magnet the clip started moving toward the top magnet. This indicates that a more than satisfactory flow of magnetic flux line is between the base and top magnet.

Gauss readings were performed of the magnetic flux on the center line with one base magnet and a second reading with top and base magnets. In the following table, C1 is the readings with a single base magnet and not stopper magnet being present. C2 is a reading where there is both a base magnet and a stopper magnet at the same locations as in C1. O1 are the readings that would be on the outer diameter of the bottle with only the base magnet and no stopper magnet. O2 are the readings that would be on the outer diameter of the bottle with the base magnet and a stopper magnet present.

| Distance in inches from the base magnet | C1 | C2 | O1 | O2 |
| --- | --- | --- | --- | --- |
| 1 inch | 270 | 247 | 145 | 135 |
| 2" | 134 | 138 | 75 | 67 |
| 3" | 70 | 68 | 45 | 37 |
| 4" | 36 | 38 | 28 | 24 |
| 5" | 22 | 24 | 17 | 16 |
| 6" | 15 | 19 | 11 | 9 |
| 7" | 11 | 57 | 8 | 6 |
| 8" | 8 | 84 | 6 | 4 |
| 9" | 6 | 740* | 4 | 2 |

The Gauss reading on the small magnet. The high number is due to the smaller diameter of the magnet thus having the flux lines more dense. The energy of the magnet remains the same. As can be seen from the Gauss reading numbers, the flow of molecules in the wine should be slow and gentle following the magnetic flux path, thus, it should produce a nicely enhanced and better aged wine.

I claim:

1. An apparatus for improving the taste of a beverage in a container said container having a top and a bottom, said beverage containing a polar molecule, said apparatus having a base for the bottom of said container, said base comprising a first magnet that applies a magnetic force to the beverage at the bottom of the container and a second magnet that applies a magnetic force to the beverage at the top of the container said second magnet being contained in a stopper at least a portion of said stopper being adopted to be received by an orifice in the top of said container.

2. The apparatus according to claim 1 wherein the beverage contains an alcohol.

3. The apparatus according to claim 1 wherein the beverage is coffee.

4. The apparatus according to claim 1 wherein the beverage is a wine.

5. The apparatus according to claim 1 wherein said base comprises a top member, a bottom member and a side wall connecting the top and bottom members said magnet being between said top member and said bottom member.

6. The apparatus according to claim 5 wherein said first magnet is a ring magnet.

7. The apparatus according to claim 1 wherein said means for applying a magnetic force to the top of said container comprises a stopper for an orifice in said container.

8. The apparatus according to claim 7 wherein said stopper comprises a top member and a plug member extending therefrom, said plug member being shaped to be inserted into the orifice of the container.

9. The apparatus according to claim 8 wherein the plug has a neck where said plug member is connected to said top member and a tip on said plug opposite said neck, said plug member being narrower in cross-section at said tip than at the neck.

10. An apparatus for improving the taste of a beverage in a container said container having a top and a bottom, said beverage containing a polar molecule, said apparatus having a base for the bottom of said container, said base comprising a magnet that applies a magnetic force to the beverage wherein said base comprises a top member, a bottom member and a side wall connecting the top and bottom members said magnet being between said top member and said bottom member, said magnet having a first surface and a second surface, said first surface being adjacent to the bottom of the container and said second surface being on the opposite side of the magnet from the first surface, said apparatus further comprising a stopper said stopper having a magnet present therein and at least a portion of said stopper being adapted to be received in an orifice at the top of said container.

11. The apparatus according to claim 10 wherein at least one magnet has 600 to 1400 surface Gauss on the surface of the magnet adjacent to the container.

12. The apparatus according to claim 10 wherein at least one magnet has 800 to 1200 Gauss on the surface of the magnet adjacent to the container.

13. The apparatus according to claim 10 wherein at least one magnet has 900 to 1100 Gauss on the surface of the magnet adjacent to the container.

14. The apparatus according to claim 12 wherein said magnet in said base has its south pole facing downwardly.

15. An apparatus for improving the taste of a beverage in a container said container having a top and a bottom, said beverage containing a polar molecule, said apparatus having a base for the bottom of said container, said base comprising a magnet that applies a magnetic force to the beverage, wherein said magnet is a ring magnet, said magnet having a first surface and a second surface, said first surface being adjacent to the bottom of the container and said second surface being on the opposite side of the magnet from the first surface, said apparatus further comprising a stopper said stopper having a magnet present therein and at least a portion of said stopper being adapted to be received in an orifice at the top of said container.

16. The apparatus according to claim 15 wherein at least one magnet has 600 to 1400 surface Gauss on the surface of the magnet adjacent to the container.

17. The apparatus according to claim 15 wherein at least one magnet has 800 to 1200 Gauss on the surface of the magnet adjacent to the container.

18. The apparatus according to claim 15 wherein at least one magnet has 900 to 1100 Gauss on the surface of the magnet adjacent to the container.

19. An apparatus for improving the taste of a beverage in a container said container having a top and a bottom, said beverage containing a polar molecule, said apparatus having a base for the bottom of said container, said base comprising a magnet that applies a magnetic force to the beverage, said magnet having a first surface and a second surface, said first surface being adjacent to the bottom of the container and said second surface being on the opposite side of the magnet from the first surface, said apparatus further comprising a stopper said stopper having a magnet present therein and at least a portion of said stopper being adapted to be received in an orifice at the top of said container, said stopper further comprising a top member and a plug member extending therefrom, said plug member being shaped to be inserted into the orifice of the container.

20. The apparatus according to claim 19 wherein the plug has a neck where said plug member is connected to said top member and a tip on said plug opposite said neck, said plug member being narrower in cross-section at said tip than at the neck.

21. The apparatus according to claim 20 wherein the top member is larger in cross-section than the cross-section of the container at the orifice.

22. The apparatus according to claim 20 wherein said magnet is a disk in the plug member.

23. The apparatus according to claim 19 wherein at least one magnet has 600 to 1400 surface Gauss on the surface of the magnet adjacent to the container.

24. The apparatus according to claim 19 wherein at least one magnet has 800 to 1200 Gauss on the surface of the magnet adjacent to the container.

25. The apparatus according to claim 19 wherein at least one magnet has 900 to 1100 Gauss on the surface of the magnet adjacent to the container.

26. An apparatus for improving the taste of a beverage in a container said container having a top and a bottom, said beverage containing a polar molecule, said apparatus having a base for the bottom of said container, said base comprising a magnet that applies a magnetic force to the beverage, said magnet having a first surface and a second surface, said first surface being adjacent to the bottom of the container and said second surface being on the opposite side of the magnet from the first surface, said apparatus further comprising a stopper said stopper having a magnet present therein and at least a portion of said stopper being adapted to be received in an orifice at the top of said container, wherein said magnets of said stopper and said base have their fields aligned such that a circle of magnetic force is formed.

27. The apparatus according to claim 26 wherein the magnet of said stopper has the south pole facing down and the magnet of said base has the north pole facing up.

28. The apparatus according to claim 26 wherein the magnet of said stopper has the north pole facing down and the magnet of said base has the south pole facing up.

* * * * *